United States Patent [19]

Mendoza

[11] Patent Number: 4,715,272
[45] Date of Patent: Dec. 29, 1987

[54] SYSTEM FOR PREPARING TORTILLAS

[76] Inventor: Fausto C. Mendoza, Calzada San Esteban Num 57, Naucalpan de Juarez, Mexico

[21] Appl. No.: 834,399

[22] Filed: Feb. 27, 1986

[30] Foreign Application Priority Data

Jul. 2, 1985 [MX] Mexico .................................. 205863

[51] Int. Cl.$^4$ ............................................. A21B 1/42
[52] U.S. Cl. ..................................... 99/339; 99/352; 99/357; 99/443 C; 99/470
[58] Field of Search ................ 99/443 C, 443 R, 355, 99/352, 395, 397, 331, 470, 477, 372–374; 426/523; 219/391, 394, 400

[56] References Cited

U.S. PATENT DOCUMENTS

| | | | |
|---|---|---|---|
| 2,104,282 | 1/1938 | Wagener et al. | 99/355 |
| 2,112,309 | 3/1938 | Santillan | 99/339 |
| 3,770,408 | 11/1973 | McCully | 219/400 |
| 3,993,788 | 11/1976 | Longenecker | 99/443 C |
| 4,092,390 | 5/1978 | Mulvany | 219/400 |
| 4,309,938 | 1/1982 | Harmon | 99/443 C |
| 4,549,477 | 10/1985 | McCabe | 99/477 |

Primary Examiner—Timothy F. Simone
Attorney, Agent, or Firm—Jeffers, Hoffman & Niewyk

[57] ABSTRACT

A system for preparing tortillas includes a tortilla cooking oven and a cooked tortilla cooling device associated with the oven. The cooking oven has an entrance at which uncooked tortillas are received and an exit from which cooked tortillas are discharged. The oven also include a plurality of superposed transporting members which define a cooking path along which each tortilla travels through the oven and in which each of the opposite sides of the tortilla at separate portions of the path are subjected to cooking at the same temperature and over the same amount of time. The cooling device associated the oven is adapted to receive cooked tortillas from the exit of the oven and to form a cushion of pressurized air whereby the tortillas can be moved on the air cushion along a predetermined cooling path, for example by operator assist, such that the cooked tortillas are cooled by the time they reach the end of the cooling path.

10 Claims, 4 Drawing Figures

SYSTEM FOR PREPARING TORTILLAS

BACKGROUND OF THE INVENTION

1. Field of the Invention

The present invention generally relates to tortilla preparation and, more particularly, is concerned with a system having a tortilla cooking oven and associated cooling device incorporating improvements which enhance the productivity of the system and the quality of the cooked product, while at the same time reduce the space required by, and the cost of, the components of the system.

2. Description of the Prior Art

From time immemorial the corn tortilla has always been cooked by the system of placing it on a hot cooking surface. Then, after cooking for about fifteen seconds (depending on the thickness of the tortilla) on one side, the tortilla is turned over so that the other side is also cooked for a comparable period of time in contact with the hot surface. After this, the tortilla is turned for a second time to again place its first side on the hot surface and cook it for another fifteen seconds. At the lapse of this final period, the tortilla is completely cooked. However, it will be observed that the first side of the tortilla has been in contact with the hot cooking surface for a period of time about twice as long as that for the second side. As a result, the two opposite sides are cooked differently, the first side being more well done than the second side.

Tortilla cooking ovens presently in use employ three superposed cooker belts which transport the tortilla through the oven such that one side is cooked first, next the opposite side is cooked, and finally the first side is cooked again, as described above. More particularly, on the upper, first belt, the tortilla is initially cooked on its first side. It is then transferred to a middle, second belt where it is cooked on its opposite second side, and finally after transfer to the third, lower belt, the tortilla is cooked on its first side again. Devices referred to as gliders are used at the ends of each pair of belts where the tortillas will be transferred from an upper belt to the next lower belt. This device provides a stationary curved transfer surface extending between the respective exit and entry ends of the pair of belts upon and along which the tortillas discharging off the exit end of the upper belt are guided to slide downwardly to the entry end of the next lower belt.

While the lower transfer glider linking the exit end of the second, middle belt with the entry end of the third, lower belt fulfills its function satisfactorily, the upper glider which extends between the exit end of the first, upper belt and the entry end of the second, middle belt functions unsatisfactorily from time to time. The problem arises due to the fact that the tortillas, by design, are insufficiently cooked when whey reach the upper glider, causing them to adhere to the glider, where they agglutinate or stick together and not slide down to the middle belt. This problem must be corrected manually by the operator which diminishes production efficiency of the oven and deteriorates the quality of the product. In order to prevent this problem from arising, commonly the operator will increase the oven temperature, whereby the tortillas will now be overcooked on the upper belt in such a way that, by being more cooked and thus better structured, the tortillas will no longer adhere to the upper glider. However, the end result of this action taken by the operator is that the quality of the tortilla is diminished, if not spoiled. The initial excessive cooking on the upper belt makes it dry and brittle.

Another problem of the tortilla preparation system presently used is that the device for cooling the cooked tortillas involves a multiplicity of parts and a very voluminous set of mesh belts having a high cost and a low operating efficiency. As regards cost and by way of example, the parts of the present cooling device include five mesh belts, twenty axle bearings, six shafts, and a number of sprockets, chains, and transmissions.

Consequently, it is readily seen that there is a need for improvements to be made in the system presently used for tortilla preparation which will effectively overcome the above described problems without introducing a set of new ones.

SUMMARY OF THE INVENTION

The present invention provides an improved tortilla preparation system designed to satisfy the aforementioned needs. One of the improvements relates to the increase in the number of cooker belts used in the tortilla cooking oven of the system such that the time the tortilla remains on each belt is reduced and the cooking of the tortilla is more uniform. In this way, the tortilla will be prepared with the same degree of cooking on its two opposite sides, whereby its quality is raised to an extraordinary level. Since it is cooked homogeneously, the tortilla has a better flavor and presentation, it takes longer to harden, and its handling ability is better.

In addition, another improvement relates to the provision of an improved glider associated with the two uppermost belts in the oven and having a movable transport surface which receives the tortilla from the exit end of the uppermost belt and transfers it to the entry end of the next uppermost belt without the need for the tortilla to be excessively cooked on the upper belt. The improved glider works well even though the tortilla has a tendency to adhere and agglutinate as is normal when it leaves the upper belt after receiving the correct degree of cooking. The movable transport surface of the improved glider is mounted for operation at a speed synchronized with that of the cooker belts.

A final improvement relates to an improved cooling device of the system associated with the tortilla cooking oven. The improved cooling device achieves a reduction in the space it requires by at least eighty percent in relation to the prior cooling device it replaces. The improved device accomplishes in a length of about four meters the same results as were obtained heretofore in a length of about twelve meters.

Accordingly, the present invention is directed to a system for preparing tortillas, comprising in combination: (a) a tortilla cooking oven; and (b) a cooked tortilla cooling device associated with the oven. The cooking oven has an entrance at which uncooked tortillas are received and an exit from which cooked tortillas are discharged. The oven also includes means defining a cooking path along which each tortilla travels through the oven and in which each of the opposite sides of the tortilla at separate portions of the path are subjected to cooking at the same temperature and over the same amount of time. The cooling device associated the cooking oven is adapted to receive cooked tortillas from the exit of the oven and to form a cushion of pressurized air whereby the tortillas can be moved on the air cushion along a predetermined cooling path such that the tortillas are cooled by the time they reach the end of the cooling path.

More particularly, the cooking path defining means includes a plurality of transporting members disposed one above another, with each of the members having an entry end and an exit end. The cooking path defining means also includes means defining a movable transfer surface adjacent to and extending between the exit end of an uppermost one of the transporting members and the entry end of a next uppermost one of the transporting members for receiving a tortilla partially cooked on its one opposite side from the uppermost one of the members and being movable for delivering the tortilla to the next uppermost one of the members for cooking the tortilla on its other opposite side.

These and other advantages and attainments of the present invention will become apparent to those skilled in the art upon a reading of the following detailed description when taken in conjuction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
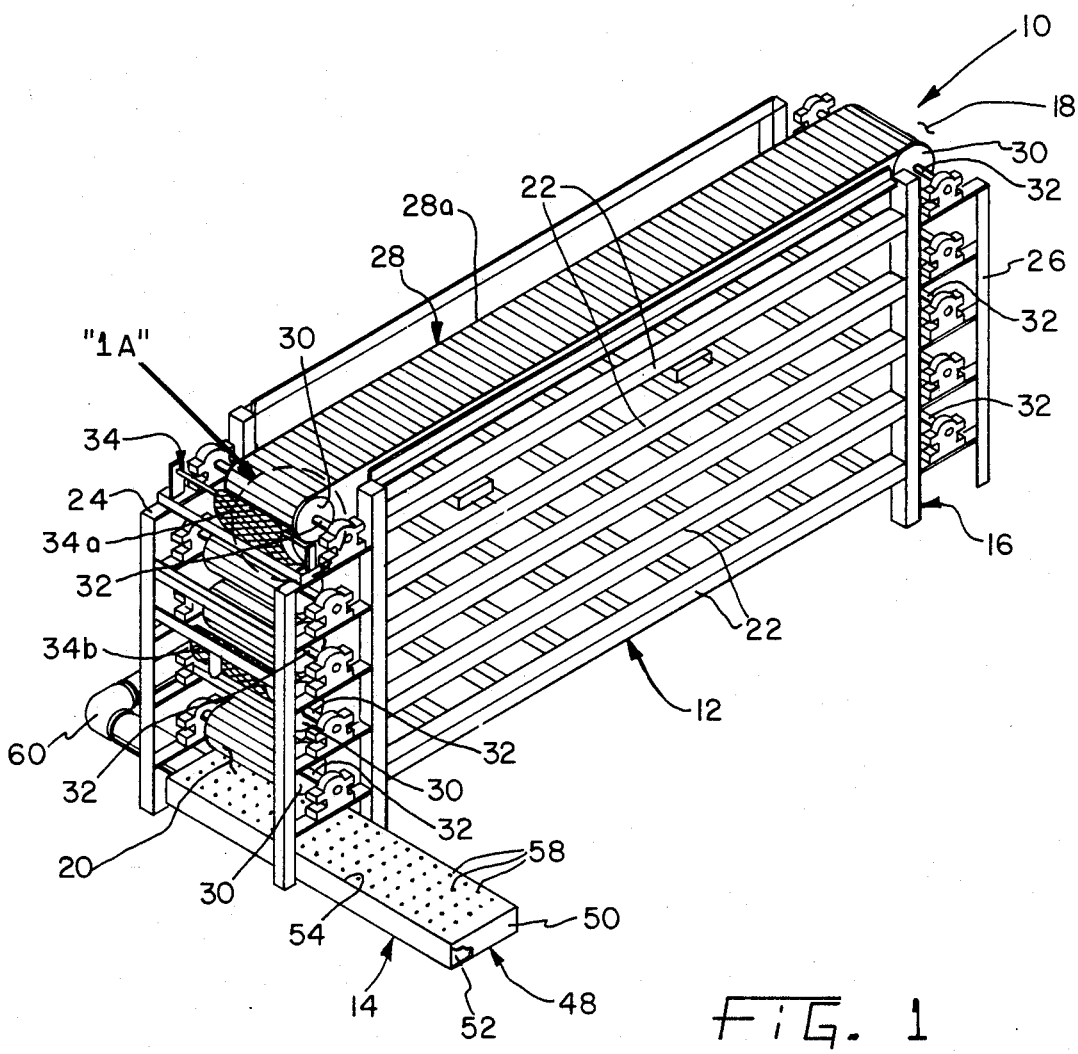
FIG. 1 is a perspective view of a tortilla preparation system including a tortilla cooking oven and a cooked tortilla cooling device associated with it which cooking oven and cooling device incorporate the improvements of the present invention.
Figure 2:
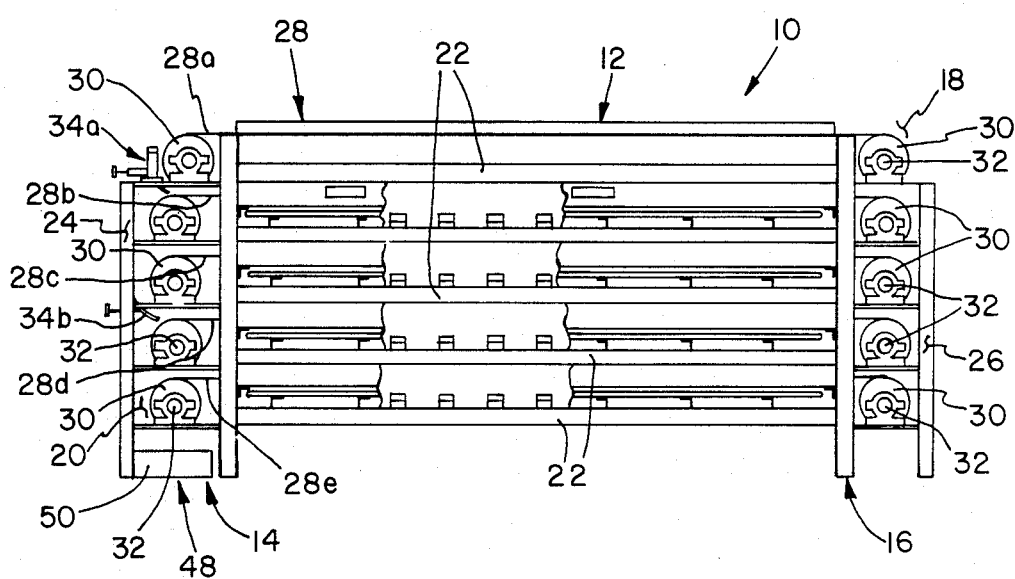
FIG. 2 is a side elevational view of the tortilla cooking oven and associated cooling device of the tortilla preparation system of FIG. 1.
Figure 3:
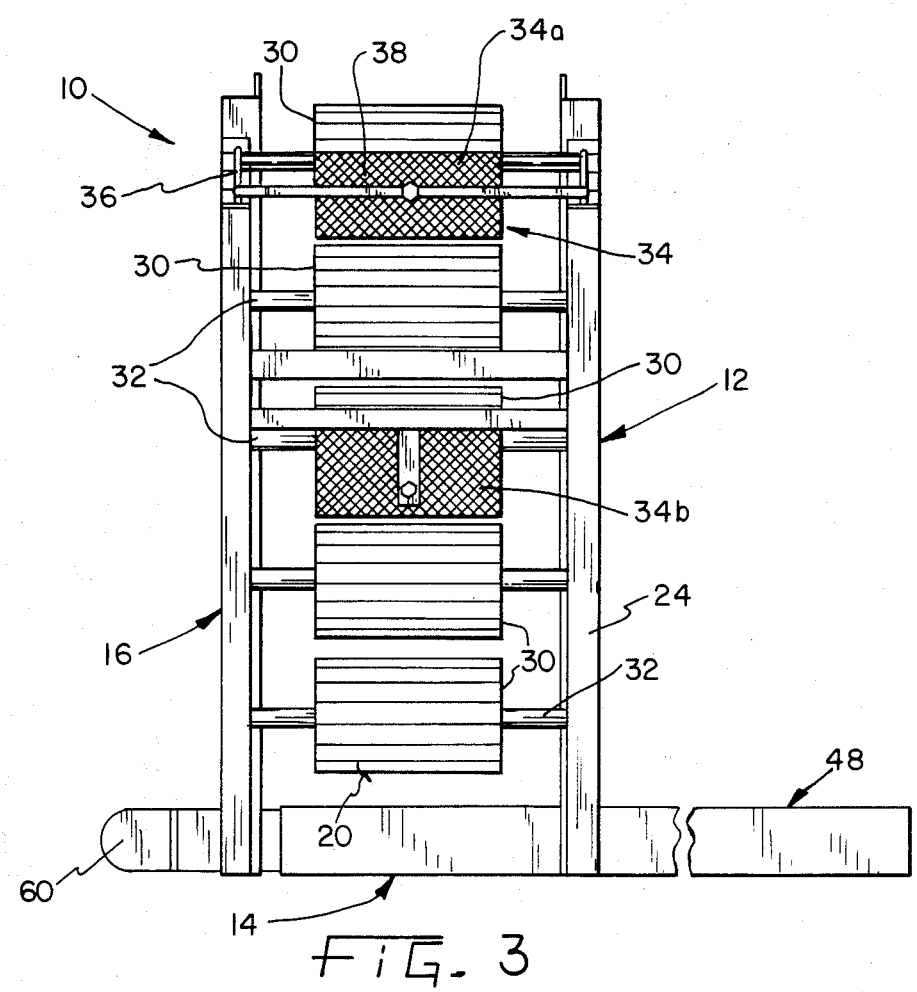
FIG. 3 is an end elevational view of the tortilla cooking oven and associated cooling device of the tortilla preparations system of FIG. 1.

Referring now to the drawings, and particularly to FIGS. 1, 2 and 3, there is shown a tortilla preparation system, generally designated by the numeral 10, including a tortilla cooking oven 12 and a cooked tortilla cooling device 14 associated with the oven 12. The cooking oven 12 and the cooling device 14 associated therewith incorporate the improvements of the present invention, the preferred embodiments of which will now be described.

The tortilla cooking oven 12 has a support frame 16 with an entrance 18 at which uncooked tortillas are received by the oven and an exit 20 from which cooked tortillas are discharged from the oven. A plurality of burners (not shown) are supported on respective ones of a series of vertically spaced open horizontal partitions 22 which extend between and rigidly interconnect with opposite ends 24,26 of the frame 16. A plurality of transporting members in the form of endless belts 28 are mounted about and extend between pairs of rollers 30 being supported on respective shafts 32 rotatably mounted at different levels on the opposite frame ends 24,26 so as to dispose the belts 28 one above another. Each of the belts 28 has an entry end and an exit end and together define a serpentine-shaped cooking path along which each tortilla travels through the oven 12 past the burners therein.

In accordance with one improved feature of the present invention, as each tortilla travels through the oven 12 along the cooking path, each of the opposite sides of the tortilla at separate portions of the path are subjected to cooking at the same temperature and over the same amount of time. To execute such cooking procedure, there are preferably four superposed transporting belts 28 at which cooking of the tortillas takes, place: a first uppermost belt 28a, a second upper middle belt 28b located immediately below the uppermost belt 28a, a third lower middle belt 28c located immediately below the second belt 28b and a fourth lowermost belt 28d located immediately below the third belt 28c. The first and third belts 28a,28c move the tortillas while resting on their same one opposite sides along the cooking path past the burners for cooking their one sides. The second and fourth belts 28b,28d move the tortillas while resting on their same other opposite sides along the cooling path past the burners for cooking their other sides. In view that the belts 28 travel at the same speed and that the burners produce the same cooking temperatures, each side of each tortilla is cooked substantially the same resulting in an enhanced uniform quality of the product.

By way of example, in each separate portion of the cooking path as represented by each of the belts 28, a given side of each tortilla is subjected to a cooking of about eight seconds. Therefore, the result is that the tortilla has been cooked homogeneously sixteen seconds on each side, that is, each side has had two separate cookings of eight seconds duration each. The cooking time of eight seconds is given as an example, since the actual time will be set in accordance with the thickness of the tortilla.

In order to transfer tortillas from the respective exit ends of the belts 28a-c to the correspondingly adjacent entry ends of the belts 28b-d, transfer means 34 are provided along the cooking path being mounted on the ends 24,26 of the frame 16. Except for the uppermost one of the transfer means 34a located at the top of the frame end 24, the rest of the transfer means 34b, (only one being seen in FIG. 2) are of conventional construction as described in the background section of the application, being referred to as stationary gliders.

Figure 1A:
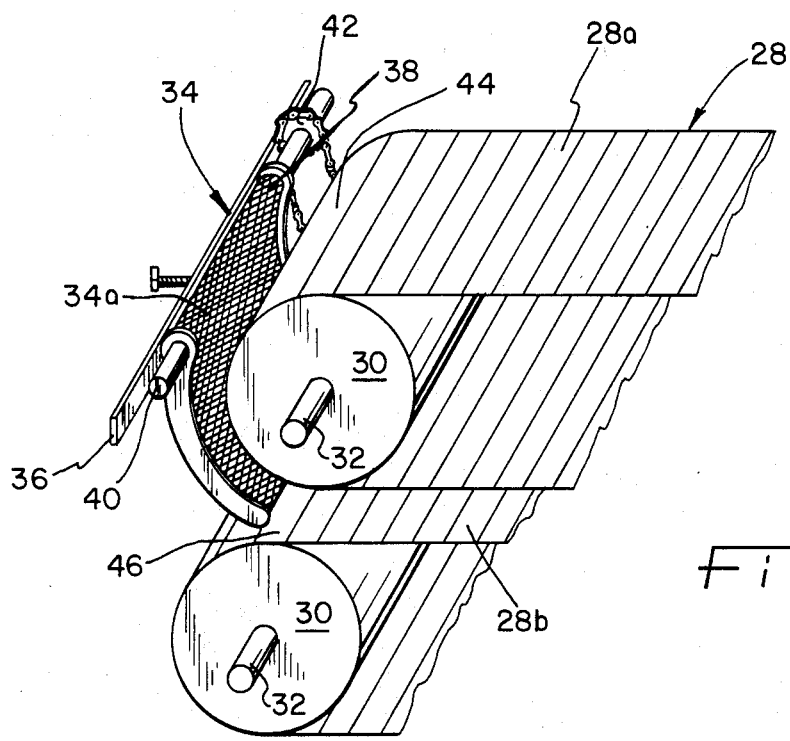
FIG. 1A is an enlarged detailed perspective view of fragmentary portion 1A of the oven of FIG. 1, showing the improved glider having the movable transport surface for moving tortillas from the exit end of the uppermost belt to the entry end of the next uppermost belt.

As best seen in FIG. 1A, the uppermost transfer means 34a is in the form of a movable glider which is mounted on a support bracket 36 attached to the frame end 24. The movable glider 34a includes a mesh belt 38 mounted over and extending between upper and lower shafts 40 (only the upper one being shown) rotatably mounted on the bracket 36. A gear 42 on the upper shaft 40 is coupled to the drive train (not shown) of the oven 12 for driving the belt 38 at a speed synchronized with the speed of the other belts 28.

In accordance with another improved feature of the present invention, the movable glider belt 38 defines a movable transfer surface adjacent to and extending between the exit end 44 of the first or uppermost transporting belt 28a and the entry end 46 of the second transporting belt 28b. The transfer surface of the belt 38 receives a tortilla partially cooked on only one side from the first belt 28a, and, by being movable and arcuate in shape, delivers the tortilla to the second belt 28b for cooking the tortilla on its other opposite side. The fact that the belt 38 is made of mesh helps to avoid the tortilla from sticking.

It has been observed that when the tortillas leave the cooking oven 12 in a hot condition and brusquely hit the environmental or ambient temperature, their quality undergoes deterioration. To avoid this the cooling device 14 is provided adjacent the cooking oven 12 for cooling the tortillas rapidly and efficiently with damaging their quality. There is a fifth transporting belt 28e in the oven 12 located below the fourth belt 28d. The fifth belt 28e receives the cooked tortillas from the cooking path at the exit end of the fourth belt and moves them along a pre-cooling path to exit 20 of the oven 12. As the tortillas move along the pre-cooling path, gradual cooling thereof takes place. Then at the exit 20 from the oven 12, the cooked and partially cooled tortillas are discharged into the cooling device 14.

In accordance with still another improved feature of the present invention, the cooling device 14 is adapted to receive cooked tortillas from the exit 20 of the oven 12 and to from a cushion of pressurized air whereby the tortillas can be moved on the air cushion along a predetermined cooling path, for example by operator assist, such that the tortillas are cooled by the time they reach the end of the path. The cooling device 14 includes an enclosure 48 in the form of a box 50 defining a chamber 52 and having an open upper end 54. A cover 56 is adapted to fit on the upper open end 54 of the box 50 so as to close the chamber 52. Also, a plurality of orifices 58 are defined through the cover 56 so as to communicate the space above it with the chamber 52 in the box 50.

Air under pressure is supplied from a suitable source via a conduit 60 through one end of the box 50 and into the chamber 52. The pressurized air within the chamber 52 can escape under pressure and flow through the orifices 58 in the cover 56 so as to form the cushion of pressurized air in the space immediately above the box 50 and chamber 52. Thereby, the relatively hot cooked tortillas when received on the pressurized air cushion from the exit 20 of the oven 12 can be moved on the cushion along the cooling path by operator assist from one end of the box 50 across its cover 56 to the opposite end such that the cooked tortillas are substantially cooled by the time they reach the end of the cooling path at the opposite end of the box 50.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A system for preparing tortillas, comprising in combination:
   (a) a tortilla cooking oven including
      (i) a support frame having an entrance at which uncooked tortillas are received and an exit from which cooked tortillas are discharged,
      (ii) means mounted on said support frame defining a cooking path extending from said entrance toward said exit thereof and along which each tortilla travels through said oven and in which each of the opposite sides of the tortilla at separate portions of said path is subjected to cooking at the same temperature and over the same amount of time,
      (iii) said cooking path defining means including a plurality of transporting members disposed on said support frame one above another with each member having an entry end and an exit end,
      (iv) said plurality of transporting members including at least one uppermost member for moving the tortillas resting on their one opposite sides along said cooking path and a lowermost member for moving the tortillas resting on their other opposite sides along said cooking path, and
      (v) another transporting member being mounted on said support frame immediately below said lowermost member for receiving the cooked tortillas therefrom and moving them along a pre-cooling path to said exit of said oven; and
   (b) a cooked tortilla cooling device associated with said tortilla cooking oven and being adapted to receive cooked tortillas from said pre-cooling path of said another transporting member at said exit of said oven so that said tortillas can be moved along a predetermined cooling path such that said tortillas are cooled by the time they reach an end of said cooling path.

2. The system as recited in claim 1, wherein said plurality of transporting members include at least a first uppermost member, a second upper middle member immediately below said uppermost member, a third lower middle member immediately below said second upper middle member, and a fourth lowermost member immediately below said third lower middle member, said first and third members for moving the tortillas resting on their one opposite sides along said cooking path and said second and fourth members for moving the tortillas resting on their other opposite sides along said cooking path.

3. The system as recited in claim 2, wherein said cooking path defining means further includes means defining a movable transfer surface adjacent to and extending between said exit end of said first uppermost member and said entry end of said second upper middle member for receiving a tortilla partially cooked on its one opposite side from said first uppermost member and being movable for delivering said tortilla to said second upper middle member for cooking the tortilla on its other opposite side.

4. The system as recited in claim 2, wherein said another transporting member is located below said fourth lowermost member for receiving the cooked tortillas from said cooking path at said exit end of said lowermost member and moving them along said pre-cooling path to said exit of said oven.

5. A system for preparing tortillas, comprising in combination:
   (a) a tortilla cooking oven including
      (i) a support frame having an entrance at which uncooked tortillas are received and an exit from which cooked tortillas are discharged,
      (ii) means mounted on said support frame defining a cooking path along which each tortilla travels through said oven and in which each of the opposite sides of the tortilla at separate portions of said path are subjected to cooking at the same temperature and over the same amount of time, said cooking path defining means including a plurality of transporting members disposed on said support frame one above another with each member having an entry end and an exit end, said plurality of transporting members including at least an uppermost member for moving the tortillas resting on their one opposite sides along said cooking path and a lowermost member for moving the tortillas resting on their other opposite sides along said cooking path, and (iii) another transporting member being mounted on said support frame immediately below said lowermost member for receiving the cooked tortillas therefrom and moving them along a pre-cooling path to said exit of said support frame; and (b) a cooked tortilla cooling device associated with said tortilla cooking oven and being adapted to receive cooked tortillas from said pre-cooling path of said another transporting member at said exit of said oven and to form a cushion of pressurized air whereby said tortillas received on said cooling device can be moved on said air cushion along a predetermined cooling path such that said tortillas are cooled by the time they reach an end of said path.

6. The system as recited in claim 5, wherein said plurality of transporting members include at least a first uppermost member, a second upper middle member immediately below said uppermost member, a third lower middle member immediately below said second upper middle member, and a fourth lowermost member immediately below said third lower middle member, said first and third members for moving the tortillas resting on their one opposite sides along said cooking path and said second and fourth members for moving the tortillas resting on their other opposite sides along said cooling path.

7. The system as recited in claim 6, wherein said cooking path defining means further includes means defining a movable transfer surface adjacent to and extending between said exit end of said first uppermost member and said entry end of said second upper middle member for receiving a tortilla partially cooked on its one opposite side from said first uppermost member and being movable for delivering said tortilla to said second upper middle member for cooking the tortilla on its other opposite side.

8. The system as recited in claim 7, wherein said cooling device includes:

enclosure means defining a chamber and a plurality of orifices defined therein along an upper side thereof; and means for supplying air under pressure to said chamber such that said air will escape under pressure through said orifices in said upper side thereof so as to form said cushion of pressurized air above said chamber, whereby cooked tortillas when received on said air cushion from said exit of said oven can be moved on said cushion along said predetermined cooling path across said upper side of said chamber such that said cooked tortillas are cooled by the time they reach said end of said cooling path.

9. The system as recited in claim 8, wherein said enclosure means means includes:

a box defining said chamber and having an open upper end; and a cover adapted to fit on said upper open end of said box so as to close said chamber and define said upper side thereof having said plurality of orifices defined therein.

10. The system as recited in claim 6, wherein said other transporting member is located below said fourth lowermost member for receiving the cooked tortillas from said cooking path at said exit end of said lowermost member and moving them along said pre-cooling path to said exit of said oven.

* * * * *

UNITED STATES PATENT AND TRADEMARK OFFICE
CERTIFICATE OF CORRECTION

PATENT NO. : 4,715,272
DATED : December 29, 1987
INVENTOR(S) : Fausto Celorio Mendoza  S&S 43

It is certified that error appears in the above-identified patent and that said Letters Patent is hereby corrected as shown below:

Col. 4, line 11, delete "," after "takes";
Col. 5, line 21, change "from" to --form--;
Claim 2, Col. 6, line 34, change "cooling" to --cooking--;
Claim 2, Col. 6, line 37, change "cooking" to --cooling--.

Signed and Sealed this

Seventeenth Day of May, 1988

Attest:

DONALD J. QUIGG

*Attesting Officer*   Commissioner of Patents and Trademarks